July 29, 1924.
H. HAUPT
BELT FASTENER
Filed March 23, 1922
1,503,322
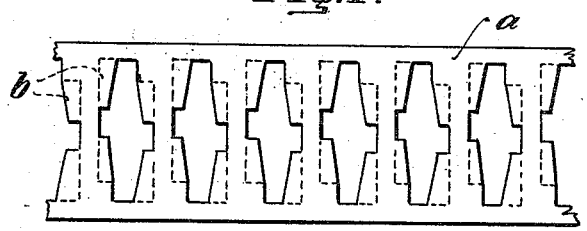
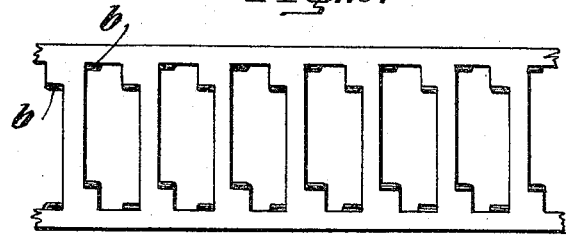
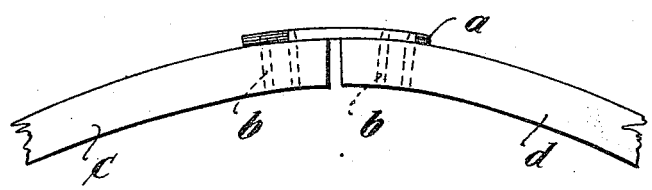
Inventor:
Hans Haupt.

Patented July 29, 1924.

1,503,322

UNITED STATES PATENT OFFICE.

HANS HAUPT, OF BERLIN-CHARLOTTENBURG, GERMANY.

BELT FASTENER.

Application filed March 23, 1922. Serial No. 546,116.

*To all whom it may concern:*

Be it known that I, HANS HAUPT, a citizen of Germany, residing at Berlin-Charlottenburg, Germany, have invented certain new and useful Improvements in Belt Fasteners (for which I have filed an application in Germany on March 26, 1921), of which the following is a specification.

This invention has reference to improvements in belt fasteners and it is one of the objects of my invention to provide means whereby the fastener is prevented from becoming unintentionally detached from the belt, and to generally improve the construction of devices of this kind.

In belt fasteners with belt engaging teeth as heretofore constructed the teeth are usually cut out from a metal plate by a punching die or the like in such a manner that the teeth are curved or bent upwards in the direction of the pull of the belt, so that by the strain of the pull the outward bend of the teeth is increased, while in connecting or coupling devices it is of advantage to produce a bending backwards of the teeth, in which case, however, the teeth will, of course, offer less resistance and are liable to be broken off.

Inasmuch as teeth which are bent upwards in the direction of the pull of the belt will have to be secured to metal parts which are spaced for at least the full length of a tooth joint, so that the outer teeth will have to engage beyond the ends of the belt for a rather considerable distance, there is the difficulty in fasteners of this kind that these outer teeth which are at a relatively greater distance from the center line of the fastener, become disengaged from the belt in case of a particularly large curvature of the belt upon the pulley.

My invention is intended to overcome this difficulty by providing the sheet metal plate from which the teeth are bent outwards in the direction of the pull, with grate-shaped or recessed parts, so that the fastener is able to adapt itself to the curvature of the belt over the pulleys.

By this means a very increased flexibility and elasticity of the fastener is produced as compared with fasteners having teeth secured to unperforated metal plates. Moreover by my improved construction the additional advantage is obtained that the centrifugal force in view of the reduced weight of the metal will not operate to detach the fastener from the belt, and it is a point of importance from the manufacturing point of view that my new fastener, if made from sheet metal of a strength sufficient for the resisting capacity of the teeth, may be manufactured in strips of some length from which the individual fasteners may be easily broken off and detached by hand, whenever needed.

My invention is shown upon the accompanying drawing, representing a strip embodying my invention by way of example.

Figure 1 is a plan view of the grate-like metal frame. In the drawing Figure 2 is a plan view of the fastener as obtained from the strip by the bending outwards of the teeth, and Figure 3 is a side view of the fastener as secured to the belt ends.

In the drawing $a$ is the grate-like metal frame which may be obtained by a punching process; $b$ are the fastening teeth; $c$ and $d$ are the belt ends to be united.

The teeth may be provided at different portions of the skeleton shaped recesses; they are bent in the direction of the pull and they are uniformly subjected to the bending and deflecting strain in the direction of the pull.

I wish it to be understood, that I do not desire to be limited to the exact details of construction shown and described, for obvious modifications will readily occur to a person skilled in the art.

I claim:

1. In a belt fastener, a sheet metal strip comprising two parallel longitudinally extending webs, a plurality of comparatively narrow transversely extending connecting webs between said longitudinal webs, the portions intermediate said connecting webs being cut out, and teeth at both ends of the cut-out portions, the length of each tooth being less than one half of the length of the cut-out portion.

2. In a belt fastener, a sheet metal strip comprising two parallel longitudinally extending webs, a plurality of comparatively narrow transversely extending connecting webs between said longitudinal webs, the portions intermediate said connecting webs being cut out, and teeth at both ends of the cut-out portions, the length of each tooth being less than one half of the length of the cut-out portion, the width of a cut-out portion being greater than the width of a tooth.

3. A belt fastener comprising two longitudinally extending substantially parallel strips, transversely extending comparatively narrow connecting webs between the longitudinal strips and spaced from each other, and a pair of staggered oppositely disposed outwardly projecting lengthwise extending prongs on each longitudinal strip between the connecting webs.

4. In a belt fastener a flexible skeleton strip, transversely disposed, endwise oppositely shouldered parallel bars on said strip, and lengthwise extending outwardly projecting prongs upon parallel sides of the shouldered parts, and additional rows of longitudinally extending prongs in parallel staggered relation to the other prongs and transversely spaced from each other.

5. In a belt fastener, a flexible skeleton strip, transversely disposed, endwise oppositely shouldered parallel bars on said strip, lengthwise extending, outwardly projecting oppositely disposed prongs upon parallel sides of said shouldered parts, and additional oppositely disposed longitudinally extending prongs contiguous to said bars in parallel staggered relation to the other prongs and transversely spaced from each other.

6. In a belt fastener, a flexible metal skeleton strip, having transversely disposed, endwise oppositely shouldered parallelly spaced bars, lengthwise extending, outwardly projecting oppositely disposed prongs struck up from the metal of the strip and upon opposite parallel sides of said shouldered parts, and additional oppositely disposed longitudinally extending prongs integral with the strip and contiguous to said bars in parallel staggered relation to the other prongs and transversely spaced from each other.

In testimony whereof I affix my signature.

HANS HAUPT.